United States Patent [19]

Collins

[11] Patent Number: 4,748,482
[45] Date of Patent: May 31, 1988

[54] SUPPORT MEMBER

[75] Inventor: John V. Collins, Woodbridge, England

[73] Assignee: British Telecommunications Public Limited Company, United Kingdom

[21] Appl. No.: 93,121

[22] Filed: Sep. 2, 1987

Related U.S. Application Data

[63] Continuation of Ser. No. 704,594, Feb. 22, 1985, abandoned.

[30] Foreign Application Priority Data

Feb. 23, 1984 [GB] United Kingdom ................ 8404782

[51] Int. Cl.$^4$ ............................................. H01L 23/36
[52] U.S. Cl. ........................................ 357/17; 372/36; 372/109
[58] Field of Search ...................... 357/81, 17; 372/36, 372/34, 109

[56] References Cited

U.S. PATENT DOCUMENTS

| | | | |
|---|---|---|---|
| 3,711,789 | 1/1973 | Dierschke | 372/75 |
| 3,878,556 | 4/1975 | Nyul . | |
| 3,949,315 | 4/1976 | Zeidler . | |
| 4,267,550 | 5/1981 | Johnson . | |
| 4,581,629 | 4/1986 | Harvey et al. | 372/36 |

FOREIGN PATENT DOCUMENTS 051574 12/1982 European Pat. Off. .
2065918 7/1981 United Kingdom .
2093631 9/1982 United Kingdom .

OTHER PUBLICATIONS

Dyment et al., "Continuous Operation of GaAs Junction Lasers on Diamond Heat Sinks at 200° K.", Appl. Phys. Letts., vol. 11, No. 9, Nov. 1967.
Ripper et al.; "Stripe-Geometry Double Heterostructure Junction Lasers: Make Structure and CW Operation Above Room Temp"; Appl. Phys. Lett. vol. 18, No. 4, Feb. 15, 1971.
Pat. Abstracts of Japan, vol. 5 No. 137 (E-72) (809), 8/29/81, p. 127 E72; & JP—56 73485 Fujitsu K. K. Jun. 18, 1981.
IBM Technical Disclosure Bulletin, vol. 13, No. 12 May, 1971 p. 3625 F. T. Byrne: "Laser Diode having a narrow frequency . . . . . ".

Primary Examiner—Leon Scott, Jr.
Attorney, Agent, or Firm—Nixon & Vanderhye

[57] ABSTRACT

A support member (11) for optical devices has a device support face (12) which tapers between two sides (22, 25). Such a support member (11) can be used to support any one of a set of optical devices, the optical devices in the set being of different lengths, while still providing access to both ends of the optical device. The support member (11) has particular application in optical communications.

21 Claims, 1 Drawing Sheet

SUPPORT MEMBER

This is a continuation of application Ser. No. 704,594, filed Feb. 22, 1985, now abandoned.

FIELD OF THE INVENTION

This invention relates to support members for use in supporting optical devices in the field of optical communications.

BACKGROUND OF THE INVENTION

Optical devices are used in combination with other elements in optical communication systems. It is generally necessary to provide connections to the devices for the input or output of optical power. In order to facilitate the making of these connections it is advantageous to mount the optical device on a support member.

The nature of many optical devices, for instance semiconductor stripe lasers is that, in use, the optical activity with which the device is concerned is located in a longitudinal volume extending the length of the device. Input or output of optical power to or from the device must be made at an end of the longitudinal volume. In a number of applications of such devices a port for input or output of optical power is necessary at both ends of the longitudinal volume. Any support member on which the device is mounted for use in these applications must therefore be designed to allow access to both ends.

We have observed that the quality of optical signal achieved can be impaired by its transmission into or out of the device concerned and that this can present serious difficulties. In particular, if the deivce is mounted on a face of a support member which extends beyond either end of the device's longitudinal volume, partial reflection of the signal can occur at the face of the support member. Subsequent interference between reflected and unreflected components of the signal can then cause fluctuations of amplitude and phase distrubance. It can therefore be important that the support member face does not extend beyond the ends of the longitudinal volume of an optical device.

Two further factors which can influence the design of a support member are firstly the fragility of optical devices and secondly the potential function of the support member as a heat sink.

Taking the first factor; because an optical device is fragile, to be efficient the support member should support it throughout its length, that is from end to end. Taking the second factor; active optical devices may tend to generate unwelcome heat during use. For instance, in semiconductor stripe lasers, which generate heat in use, an increase in temperature of the laser material leads to an increase in the input of current threshold at which it will start to lase. The higher input current required in turn leads to a further rise in temperature. Hence, the support member can play an important role by conducting heat away from the optical device. To do this efficiently, it is important that the support member is in conact with the optical device concerned throughout the latter's length.

Optical devices, however, can vary considerably in length. For instance, a semiconductor laser having an integral cavity for frequency control may measure about 1mm in length, in contrast to lasers without the cavity and for use for instance as amplifiers which may be only 100 $\mu$m in length.

SUMMARY OF THE INVENTION

It is an object of the present invention to provide a support member which is suitable for use with any one of a set of optical devices, the optical devices in the set being of different lengths.

The present invention provides a support member for an optical device which comprises a block of material having a planar device support face wherein the face is provided with two straight sides which lie at an angle in the range 1° to 30°, with respect to each other.

The present invention further provides an optical assembly which comprises an optical device with two ports, and a support member having a support face tapering between two sides, wherein the device is positioned on the support face such that each port respectively substantially overlies a point in each of said sides.

It should be noted that no word used herein should be taken to imply a necessary orientation of a support member in space. Such words, including "overlies" and "uppermost", are used for convenience of description only.

An advantage of support members according to the present invention is that they are susceptible to mass production. One support member may be suitable for use with varying types of optical device and that support member can therefore be usefully reproduced in quantity.

An advantage of optical assemblies according to the present invention is that each optical device and its respective support member do not have to be matched in size to a fine tolerance. Production of both the support member and the optical device may thus be made simpler.

Examples of applications in which support members according to embodiments of the invention are particularly useful include the following:

(i) a semiconductor stripe laser being used to regenerate a signal transmitted by an optical fibre, and (ii) an external cavity being used in conjunction with a semiconductor stripe laser in order to lock the output signal of the laser to a chosen frequency mode.

In example (i) the laser is positioned between the ends of two opitcal fibres and the signal is transmitted from one fibre to the other via the longitudinal volume of the laser. In example (ii) the external cavity picks up and returns optical power at one end of the longitudinal volume of the laser and an optical signal, modified by the presence of the cavity, is emitted at the other end of the longitudinal volume.

BRIEF DESCRIPTION OF THE DRAWINGS

A support member according to the invention will now be described with reference to the accompanying figures in which.

DETAILED DESCRIPTION

Figure 1:
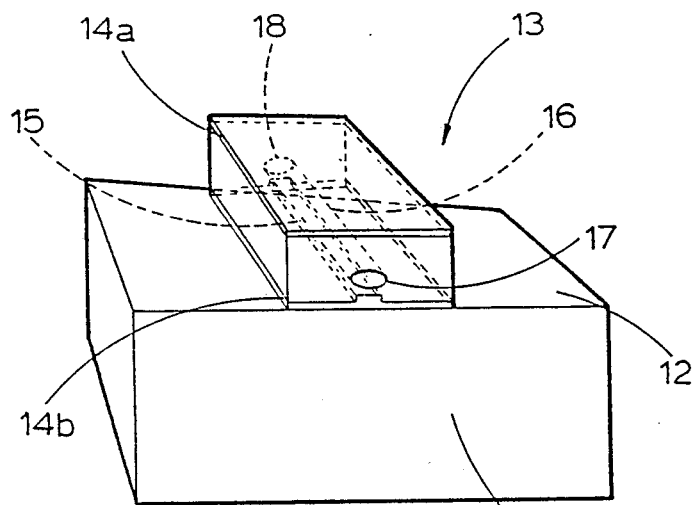
FIG. 1 shows a perspective view of an optical device mounted on the support member
Figure 2:
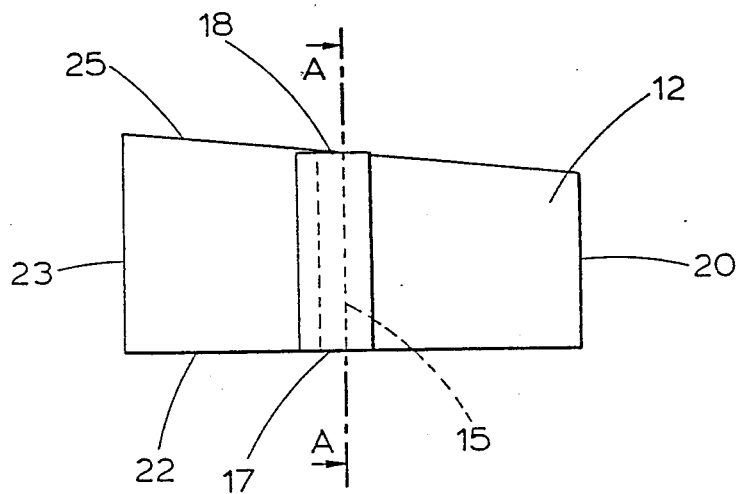
FIG. 2 shows a plan view of the arrangement of FIG. 1.

Referring to FIGS. 1 and 2, the support member 11 comprises a block of material which has a planar face 12 on which an optical device can be supported. The planar face is hereinafter referred to as the support face 12.

The optical device is a semiconductor stripe laser 13 and can be represented as a shallow cuboid. Each major face of the cuboid is coated with a metal layer 14a, 14b, the metal layer 14b on the lower face having a narrow strip 15 of greater depth which extends the length of the cuboid. The metal layers 14a, 14b provide contacts to the laser 13 through which a driving current can be supplied. In use the driving current leads to lasing activity in a buried longitudinal volume 16 which lies parallel to and between the upper metal layer 14a and the strip 15, also extending the length of the laser 13. Each end of the longitudinal volume 16 conitutes an input/output site 17, 18 for optical power to be fed into or out of the laser 13. The laser 13 in the direction of the longitudinal volume 16 is 200 $\mu$m long while the strip 15 is 2 $\mu$m wide. (It should be noted that the laser 13 is not shown to an accurate scale). The width of the longitudinal volume 16 is less than or equal to the width of the strip 15.

The support member 11 is a right prism on a base 19 which is a trapezium, two adjacent internal angles of which trapezium are 90°. The uppermost face, that is the support face 12, of the support member 11 is therefore also a trapezium, congruent with the base 19.

The remaining two internal angles of the support face 12 are 95° and 85° respectively. The distance between its parallel sides 20, 23 is 2 mm and the distance between the midpoints of its non-parallel sides 22, 25 is 200 $\mu$m, that is, the same length as the laser 13 and its longitudinal volume 16. The distance between the base 19 and the support face 12 of the support member 11 is 1.5 mm.

The laser 13 is mounted on the support face 12 such that the metal layer 14b which is provided with a stripe 15 is parallel and adjacent to the support face 12. Further, the laser 13 is positioned such that the stripe 15 lies parallel to, and midway between, the parallel sides 20, 23 of the support face 12, while the ports 17 18 of the laser 13 are substantially aligned with the non-parallel sides 22, 25.

It will be clear that although a first port 17 may be aligned with one of the non-parallel sides 22, the second port 18 will be out of alignment with the other of the non-parallel sides 25 by 10°. Since, as a result of the above arrangement, the stripe 15 lies symmetrically above the line joining the midpoints of the two non-parallel sides 22, 25 the laser 13 will show an overhang and an equal underhand on either side of said line with respect to the non-parallel side 25 concerned.

Figure 3:
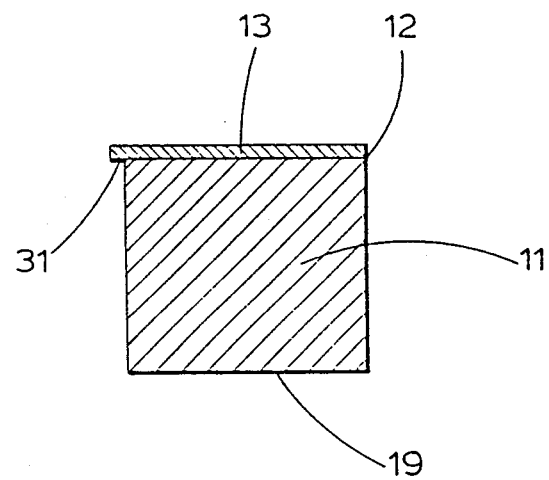
FIG. 3 shows a cross section taken along the line AA in FIG. 2.

Referring to FIGS. 2 and 3, it will also be clear that the maximum overhang 31 that will exist between the stripe 15 and the support member 11 occurs at a corner of the stripe 15 and will be equal to $\frac{1}{2}$ A tan 10° where A is the width of the stripe 15. In the arrangement described above the maximum overhang of the stripe 15, and therefore the maximum underhang, is 0.088 $\mu$m. Typically, in use, the longitudinal volume 16 may be 3 $\mu$m wide and the maximum overhang of the longitudinal volume 16 would then be 0.132 $\mu$m. At present, it is only generally possible to bond a laser to a support member to within a tolerance in position of abou 2 $\mu$m. Therefore a maximum overhang of 0.132 $\mu$m can be considered to be insignificant.

Figure 4:
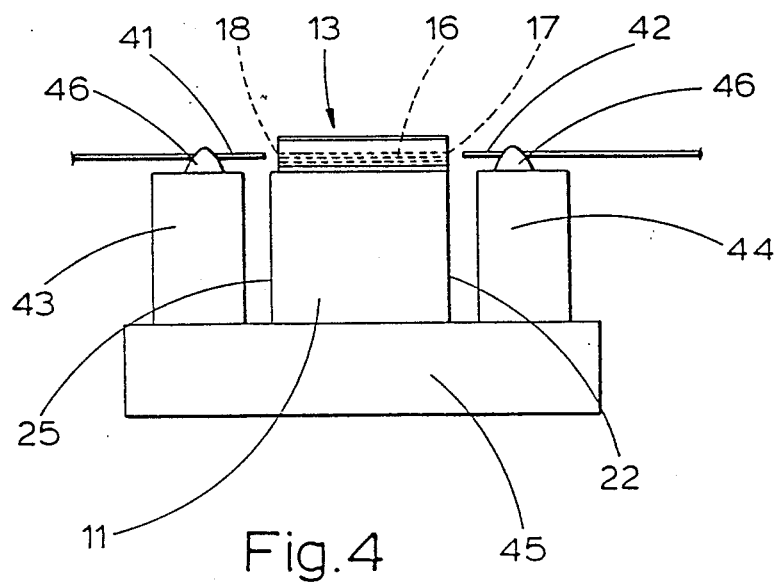
FIG. 4 shows a perspective view of an optical assembly incorporating the support member and optical device of FIG. 1

Referring to FIG. 4, an optical signal amplifying assembly incorporating the support member 11 and laser 13 described above comprises two optical fibre ends 41, 42, the support member 11, the laser 13, two fibre mounts 43, 44 and a base 45. (Arrangements suitable for supplying a driving current to the laser 13 will be clear to a person skilled in the art of optical communications and are not therefore described.) The support member 11 is placed between the fibre mounts 43, 44 on the base 45, the fibre mounts 43, 44 being adjacent to the non-parallel sides 22, 25 of the support member 11. The laser 13 is positioned on the support member 11 as described above and the two optical fibre ends 41, 42 are aligned with the longitudinal volume 16 of the laser 13. The fibre ends 41, 42 are held in place on the fibre mounts 43, 44 by the use of a suitable solder material 46 and extend to within 50 $\mu$m of each respective end 17, 18 of the longitudinal volume 16. In use, the signal emitted by a first optical fibre end 41 is transmitted into one port 18 of the longitudinal volume 16 of the laser 13. It is then amplified before being emitted from the other port 17 of the longitudinal volume 16 into a second optical fibre end 42.

Typically a semiconductor stripe laser 13 may be operated at a temperature in the range of 10°-70° C. The material out of which the support member 11 is constructed may be diamond, which typically has a thermal conductivity at room temperature of 20 W.cm$^{-1}$(° C.)$^{-1}$. The support member 11 will then act as a heat sink conducting heat away from the longitudinal volume 16 of the laser 13. It may be necessary to provide a further heat sink on which the diamond support member 11 is mounted. In the optical signal and amplifying assembly described the base 45 will act as a further heat sink. In general, however, the thermal requirements of the optical device concerned will determine at least in part what material will be selected for the support member 11 and any combination with a sub-mount that may be required. Other examples of suitable materials for the support member 11 are copper whose thermal conductivity are room temperature is typically 4 W.cm$^{-1}$(° C.)$^{-1}$, or aluminum whose thermal conductivity at room temperature is typically just above 2 W.cm$^{-1}$(° C.)$^{-1}$.

The laser 13 described can be mounted by soldering on the support member 11. To do this the device support face 12 of the support member 11 is first metallized over its whole surface with a titanium coating. A eutectic alloy of gold and tin is then deposited onto the titanium coating under low pressure and used as a soldering material with which to attach the laser 13. By coating the whole surface of the device support face 12 of the support member 11 the position of the laser 13 on the face 12 can be freely adjusted after the laser 13 is placed on the face 12 and before the alloy is hardened. The laser 13 can therefore as a first step be positioned on the face 12 such that its longitudinal volume 16 extends parallel to the parallel sides 20, 23 of the support member 11 and then as a second step be slid in a direction perpendicular to said sides 20, 23 until the ports 17, 18 of the longitudinal volume 16 are aligned as required with the edges of the support face 12.

It will be clear that where the support member is to act as a heat sink it may be particularly important that the support face 12 should be in contact with as great a proportion of the surface closest to the longitudinal volume of the associated device as possible. It may then be preferable to mount the device such that the surface closest to the longitudinal volume is entirely supported on the support face 12 rather than, as described above and shown in FIG. 2, having a slight wedge-shaped overhang at one port 18.

The dimensions which are selected for the support member 11 will be at least partially determined by the dimensions and characteristics of the optical devices with which it is intended to use the support member. If one port could be misaligned substantially without affecting an optical device's usefulness then the angle between the non-parallel sides 21, 25 of the support face could be increased, for example, to 20°. This has the advantage of reducing the length of the support member 11 while retaining its usefulness for the same range of optical device lengths. For many applications, however, the angle has been found required to be in the range 7°-15°.

Alternatively, if facets at both ends of a device require to be substantially aligned with an edge of the support member 11, the support face 12, instead of being in the form of a quadrilateral with two adjacent internal angles of 90°, could be in the shape of a symmetrical truncated triangle. Again, alternatively, the longitudinal volume 16 of the laser 13 need not be arranged parallel to the parallel sides 20, 23 of the support face 12 but may be for instance at an angle such that each port 17, 18 is misaligned with its respective edge by one half the angle between the non-parallel sides 22, 25 of the support face 12.

Although it is not necessary that the support face 12 should have any two sides parallel, it is generally convenient in manufacturing of the support member 11 that this should be the case.

The dimensions given in the example described above for the support face 12 may clearly be varied to suit any range of sizes of optical device with which the support member 11 may be intended for use. For instance, the distance between the midpoints of the non-parallel sides 22, 25 might be up to 1.5 mm for use with, say, a semiconductor stripe laser having an integral external cavity. Alternatively it may be as little as 100 μm for use with a semiconductor laser intended for frequency locking applications.

I claim:

1. An optical assembly comprising an optical semiconductor device having two ports located on opposing facets and a heat sink having a device support face for supporting said optical semiconductor device, the device support face having two opposing non-parallel straight sides inclined at an angle in the range of 7° to 15° and the optical semiconductor device being positioned so that each port overlies at least a point in a respective one of said straight sides with at least one of said straight sides being angularly offset with respect to the overlying port.

2. The optical assembly of claim 1 in which the device support face is in the shape of a quadrilateral having two parallel sides.

3. The optical assembly of claim 1, in which the device support face is in the shape of a quadrilateral having two adjacent internal angles of 90°.

4. The optical assembly of claim 3 in which one of said ports is substantially coplanar with the edge of the quadrilateral support face that lies between the 90° angles.

5. The optical assembly of claim 3 in which the heat sink comprises diamond.

6. The optical assembly of claim 1 in which the heat sink comprises diamond.

7. The optical assembly of claim 1 in which the heat sink comprises a material having a thermal conductivity at 20° C. of at least 15 W.cm$^{-1}$(° C.)$^{-1}$.

8. An optical assembly comprising an optical semiconductor device having two ports located on opposing facets and a heat sink having a mounting surface onto which the optical semiconductor device is affixed with each port overlying a part of respective opposing edges of the mounting surface, and in which at least one of the opposing edges of the mounting surface is non-parallel with the respective overlying port and there is a total angular mismatch between the ports and the opposing edges of the mounting surface in the range of 7° to 15°.

9. The optical assembly of claim 8 in which the mounting surface is in the shape of a quadrilateral having two parallel sides.

10. The optical assembly of claim 8 in which the device support face is in the shape of a quadrilateral having two adjacent internal angles of 90°.

11. The optical assembly of claim 10 in which one of said ports is substantially coplanar with the edge of the quadrilateral support face that lies between the 90° angles.

12. The optical assembly of claim 10 in which the heat sink comprises diamond.

13. The optical assembly of claim 8 in which the heat sink comprises diamond.

14. The optical assembly of claim 8 in which the heat sink comprises a material having a thermal conductivity at 20° C. of at least 15 W.cm$^{-1}$(° C.)$^{-1}$.

15. In an optical device which comprises a heat sink including a mounting surface having two opposing non-parallel edges and a light emitting element that includes two ports on substantially parallel opposite facets affixed to the mounting surface with the light emitting facets overlying respective ones of the non-parallel edges of the mounting surface, the improvement wherein the non-parallel edges of the mounting surface define an angle of divergence in the range of 7° to 15° thereby enabling the mounting surface to be utilized for a range of sizes of light emitting elements in a compact assembly.

16. The improvement of claim 15 wherein the mounting surface is in the shape of a quadrilateral having two parallel sides.

17. The improvemnt of claim 15 in which the device support face is in the shape of a quadrilateral having two adjacent internal angles of 90°.

18. The improvement of claim 15 in which one of said ports is substantially coplanar with the edge of the quadilateral support face that lies between the 90° angles.

19. The improvement of claim 15 in which the heat sink comprises diamond.

20. The improvement of claim 15 in which the heat sink comprises a material having a thermal conductivity at 20° C. of at least 15 W.cm$^{-1}$(° C.)$^{-1}$.

21. The improvement of claim 17 in which the heat sink comprises diamond.

* * * * *